(12) United States Patent
Chenard et al.

(10) Patent No.: US 6,919,392 B1
(45) Date of Patent: Jul. 19, 2005

(54) STABILIZATION OF VINYL HALIDE POLYMERS

(75) Inventors: Jean-Yves Chenard, Pau (FR); Jean-Claude Mendelsohn, Sauveterre (FR)

(73) Assignee: Arkema Inc., Philadelphia, PA (US)

( * ) Notice: Subject to any disclaimer, the term of this patent is extended or adjusted under 35 U.S.C. 154(b) by 0 days.

(21) Appl. No.: 07/870,759

(22) Filed: Apr. 20, 1992

Related U.S. Application Data (63) Continuation of application No. 07/633,187, filed on Dec. 28, 1990, now abandoned, which is a continuation of application No. 07/273,669, filed on Nov. 18, 1988, now abandoned, which is a continuation of application No. 06/254,313, filed on Apr. 15, 1981, now abandoned, which is a continuation-in-part of application No. 06/070,503, filed on Aug. 28, 1979, now abandoned.

(30) Foreign Application Priority Data

Aug. 29, 1978 (FR) ............................................. 78 24863
May 11, 1979 (FR) ............................................. 79 12005

(51) Int. Cl.$^7$ .......................... C08L 27/00; C08L 27/06
(52) U.S. Cl. ...................... 524/180; 524/181; 524/182; 524/302; 524/303; 524/304; 524/305; 524/318; 524/392; 524/393; 524/395; 524/399; 556/93; 252/384; 252/400.1; 252/406; 252/407; 106/287.19; 106/287.23; 106/287.24; 106/287.27; 106/287.32
(58) Field of Search .............................. 524/180, 181, 524/182, 302, 303, 304, 305, 318, 392, 393, 395, 399, 178, 289; 252/384, 400.1, 406, 407; 106/287.19, 287.23, 287.24, 287.27, 287.32; 556/93; 260/45.75 K, 45.75 S, 45.85 R, 45.75 B, 23 XA; 560/266

(56) References Cited

U.S. PATENT DOCUMENTS

| | | | |
|---|---|---|---|
| 2,460,436 A | * | 2/1949 | Shoemaker et al. |
| 2,641,588 A | | 6/1953 | Leistner et al. |
| 2,641,596 A | | 6/1953 | Leistner et al. |
| 2,704,756 A | | 3/1955 | Leistner et al. |
| 2,707,178 A | * | 4/1955 | Wilson |
| 2,726,227 A | | 12/1955 | Leistner et al. |
| 2,743,257 A | | 4/1956 | Church et al. |
| 2,759,906 A | | 8/1956 | Leistner et al. |
| 2,789,102 A | | 4/1957 | Weinberg |
| 2,789,104 A | | 4/1957 | Ramsden |
| 2,789,963 A | | 4/1957 | Hecker |
| 2,809,956 A | * | 10/1957 | Mack |
| 2,832,750 A | | 4/1958 | Weinberg et al. |
| 2,832,752 A | | 4/1958 | Weinberg et al. |
| 2,832,753 A | | 4/1958 | Weinberg et al. |
| 2,870,119 A | * | 1/1959 | Leistner |
| 2,870,182 A | * | 1/1959 | Leistner |
| 2,872,468 A | | 2/1959 | Leistner et al. |
| 2,883,363 A | | 4/1959 | Leistner et al. |
| 2,888,435 A | | 5/1959 | Wallace, Jr. |
| 2,914,506 A | * | 11/1959 | Mack et al. |
| 3,021,302 A | * | 2/1962 | Frey |
| 3,037,961 A | | 6/1962 | Leistner et al. |
| 3,063,963 A | * | 11/1962 | Wooten et al. ....... 260/45.85 H |
| 3,115,509 A | | 12/1963 | Mack |
| 3,126,400 A | | 3/1964 | Cramer et al. |
| 3,167,527 A | * | 1/1965 | Hechenbleikner et al. .. 524/179 |
| 3,196,129 A | * | 7/1965 | Heckenbleikner et al. .. 524/179 |
| 3,442,852 A | | 5/1969 | Dorfelt |
| 3,478,071 A | * | 11/1969 | Weisfeld |
| 3,507,827 A | * | 4/1970 | Pollock ................ 260/45.85 H |
| 3,539,636 A | * | 11/1970 | Dorfelt et al. |
| 3,565,930 A | * | 2/1971 | Kauder |
| 3,576,785 A | | 4/1971 | Weisfeld |
| 3,595,893 A | * | 7/1971 | Schroeder et al. .......... 524/182 |
| 3,609,120 A | * | 9/1971 | Hoye |
| 3,627,718 A | | 12/1971 | Seifert et al. |
| 3,640,950 A | | 2/1972 | Weisfeld |
| 3,758,537 A | * | 9/1973 | Wowk ....................... 524/178 |
| 3,764,571 A | * | 10/1973 | Jennings |
| 3,769,263 A | * | 10/1973 | Mayo |
| 3,787,357 A | | 1/1974 | Brecker |
| 3,817,915 A | | 6/1974 | Kauder et al. |
| 3,830,751 A | | 8/1974 | Stapfer et al. |
| 3,855,179 A | * | 12/1974 | Wilkins |
| 3,862,066 A | | 1/1975 | Reiter et al. |
| 3,865,787 A | | 2/1975 | Ludwig et al. |
| 3,869,487 A | | 3/1975 | Kugele et al. |
| 3,886,115 A | | 5/1975 | Murayama et al. |
| 3,890,276 A | | 6/1975 | Stapfer |
| 3,890,277 A | | 6/1975 | Kugele et al. |

(Continued)

FOREIGN PATENT DOCUMENTS

| | | | |
|---|---|---|---|
| FR | 1091704 | * | 4/1955 |
| GB | 1236925 | * | 6/1971 |
| GB | 1349913 | * | 4/1974 |
| JP | 55-160044 | * | 12/1980 |
| JP | 56-2336 | * | 1/1981 |

OTHER PUBLICATIONS

Nass, L.I. "Actions and Characteristics of Stabilizers" in "Encyclopedia of PVC" (M. Dekker, New Tork, 1976), Chapter 9, p. 315.*

H. Verity Smith, "The Development of the Organotin Stabilizers" Dec. 1959, Tin Research Institute.

H. Verity Smith, "Stabilizers for Vinyl Polymers—Part 2—Metallic Compounds Other Than Soaps", British Plastics, Jun. 1954, pp. 213–27.

"Encyclopedia of Polymer Science and Technology", vol. 12, pp. 725–69 1970.

Primary Examiner—Vasu Jagannathan
(74) Attorney, Agent, or Firm—Finnegan, Henderson, Farabow, Garrett & Dunner, L.L.P.

(57) ABSTRACT

The heat and light stability imparted to vinyl halide polymers by metal compounds conventionally employed for this purpose is considerably improved by the presence of a mercapto ester such as 2-mercaptoethyl stearate. The esters can replace a substantial portion of the metal compound with no significant reduction in stability.

34 Claims, 2 Drawing Sheets

U.S. PATENT DOCUMENTS

| | | | |
|---|---|---|---|
| 3,899,465 A | | 8/1975 | Stapfer |
| 3,905,933 A | | 9/1975 | Itoh et al. |
| 3,909,492 A | | 9/1975 | Larkin et al. |
| 3,919,165 A | | 11/1975 | Hechenbleickner |
| 3,919,168 A | | 11/1975 | Dieckmann |
| 3,925,246 A | | 12/1975 | Coates et al. |
| 3,925,309 A | | 12/1975 | Weisfeld et al. |
| 3,928,284 A | | 12/1975 | Collins et al. |
| 3,928,285 A | * | 12/1975 | Gough et al. ............... 524/178 |
| 3,931,263 A | * | 1/1976 | Molt |
| 3,933,741 A | | 1/1976 | Larkin et al. |
| 3,933,743 A | | 1/1976 | Coates et al. |
| 3,933,744 A | | 1/1976 | Coates et al. |
| 3,951,925 A | | 4/1976 | Mishima et al. |
| 3,962,295 A | | 6/1976 | Collins et al. |
| 3,969,319 A | | 7/1976 | Hutton et al. |
| 3,970,689 A | * | 7/1976 | Stoffelsma et al. ......... 560/266 |
| 3,972,908 A | | 8/1976 | Collins et al. |
| 3,978,023 A | | 8/1976 | Coates et al. |
| 3,978,102 A | | 8/1976 | Coates et al. |
| 3,979,359 A | * | 9/1976 | Kugele |
| 3,987,005 A | | 10/1976 | Collins et al. |
| 3,997,495 A | | 12/1976 | Creticos |
| 3,998,782 A | | 12/1976 | Hutton et al. |
| 4,000,100 A | | 12/1976 | Baldyga |
| 4,021,407 A | * | 5/1977 | Gough |
| 4,060,508 A | * | 11/1977 | Sugahara et al. |
| 4,062,881 A | * | 12/1977 | Kugele |
| 4,093,484 A | * | 6/1978 | Harrison et al. |
| 4,115,352 A | * | 9/1978 | Bohen et al. |
| 4,120,845 A | | 10/1978 | Kugele |
| 4,122,064 A | | 10/1978 | Scheidl et al. |
| 4,134,878 A | | 1/1979 | Burley et al. |
| RE30,338 E | | 7/1980 | Kauder |
| 4,278,518 A | * | 7/1981 | Bjellqvist et al. |
| 4,360,619 A | * | 11/1982 | Kugele et al. ............... 524/181 |
| 4,412,897 A | * | 11/1983 | Kornbaum |
| 4,576,984 A | * | 3/1986 | Bresser et al. ............... 524/182 |
| 4,665,114 A | * | 5/1987 | Kugele et al. ............... 524/181 |
| 4,701,486 A | * | 10/1987 | Bresser et al. ............... 524/182 |

* cited by examiner

STABILIZATION OF VINYL HALIDE POLYMERS

CROSS REFERENCE TO RELATED APPLICATIONS

This application is a continuation, of application Ser. No. 07/633,187 filed Dec. 28, 1990, now abandoned, which is a continuation of Ser. No. 07/273,669 filed Nov. 18, 1988, now abandoned, which is a continuation of Ser. No. 06/254,313 filed Apr. 15, 1981, now abandoned, which is a continuation-in-part of Ser. No. 06/070,503 filed Aug. 28, 1997, now abandoned.

FIELD OF THE INVENTION

This invention relates to stabilizers for vinyl halide polymers. This invention further relates to additives that improve the heat and light stability imparted to vinyl halide polymers by metal compounds conventionally employed as stabilizers for these polymers.

BACKGROUND

It is well known to add various metal compounds to vinyl halide polymers for the purpose of inhibiting the degradation that occurs when these polymers are heated during fabrication, e.g., milling, extrusion, molding and calendering. Among the most effective stabilizers are 1) organotin compounds containing one or two. hydrocarbon groups bonded to the tin atom, 2) sulfur-containing antimony compounds, particularly trivalent antimony compounds of the general formula $Sb(SR)_3$ wherein R represents a hydrocarbyl group or the residue remaining following removal of the hydrogen atom from the sulfur atom of a mercaptan or mercaptocarboxylic acid ester, and 3) the alkaline earth metal, zinc, cadmium and lead salts of carboxylic acids. The relatively high cost of these stabilizers, particularly the organotin and antimony compounds, has provided an incentive to search for less expensive materials which can at least partially replace the metal compound without significantly impairing the stability imparted to the vinyl halide polymer.

DESCRIPTION OF THE PRIOR ART

The use of mercaptoacids or mercaptoalcohols to improve the resistance to discoloration imparted to vinyl chloride polymers by diorganotin derivatives of mercaptoacid esters such as dibutyltin-S,S'-bis(isooctyl mercaptoacetate) is disclosed in U.S. Pat. No. 3,507,827.

British Patent No. 771,857 teaches that the heat stability imparted to plasticized chlorine-containing vinyl polymers by mercaptoacid esters is improved by the addition of organotin compounds such as dibutyltin oxide and butyl stannoic acid. Mercaptans, mercaptoacid esters, mercaptoalcohols and mercaptoacids typically have highly objectionable odors and are volatile at the temperatures conventionally employed to process both plasticized and rigid vinyl halide polymer formulations. Governmental safety and environmental pollution regulations have precluded the use of many of these sulfur compounds as auxiliary stabilizers for vinyl halide polymers.

U.S. Pat. No. 2,707,178 teaches that the volatility and odor associated with the presence of sulfur compounds in vinyl chloride polymer compositions can be avoided, using solid resinous polyesters derived from mercaptoalcohols and dicarboxylic acids in place of conventional monomeric sulfur compounds. The polyesters are employed at concentrations of from 0.01 to 5%, based on the weight of vinyl chloride polymer. At these relatively low concentration levels it is very difficult to uniformly disperse a solid material in a molten vinyl chloride polymer. In addition, even trace amounts of unreacted mercaptoalcohol present in the polyester would generate highly disagreeable odors at the temperatures employed to process rigid vinyl chloride polymers.

Various other systems containing a mixture of one or more tin compounds with mercapto or thio compounds have been proposed. For example, according to German Patent 1,217,609, the stabilizer comprises a mixture of mono- or di-organotin with a mercapto ester. U.S. Pat. No. 3,063,963 utilizes a mercapto acid or a mercapto alcohol with a diorganotin compound. These compounds are replaced by a thio-ether in accordance with U.S. Pat. No. 3,297,629. Other patents describe the addition of substances such as thioanhydrides, mercaptols, mercaptals, aliphatic mercaptans or organic disulphides. U.S. Pat. No. 3,928,285 discloses a stabilizer composition for polyvinyl chloride comprising an organotin borate and an organic thiol. In general, when the prior art additive contains a mercaptan function, the sulphur atom is always located in the acid residue, that is to say in the chain connected to the carbon atom of the carboxylic group. However, as will be seen, the location of the mercapto group has a significant effect upon performance with respect to stabilization.

It has now been found that a portion of the metal-containing stabilizer can be replaced by a mercapto ester. Many of these esters do not have the volatility and odor associated with prior art sulfur compounds. In addition, many of these compounds are liquid, thereby avoiding the difficulties associated with uniformly dispersing relatively small amounts of a solid, resinous material into a molten vinyl halide polymer. They also have a favorable effect upon the viscosity of the resin at working temperatures and provide for lubrication, thereby facilitating flow of the resin during processing. Further, the cost of achieving a given degree of stabilization can be significantly reduced.

DESCRIPTION OF THE INVENTION

In one aspect, this in relates to compositions for imparting heat and light stability to vinyl halide polymers, said compositions comprising 1) one or more metal-containing heat stabilizers for vinyl halide polymers, in which any oxygen atoms present are bonded to one or more of said metal, carbon, phosphorus or hydrogen and 2) a mercapto ester comprising the reaction product of an optionally substituted mercaptohydrocarbylene-ol with a carboxylic acid.

The invention also relates, in another aspect, to vinyl halide polymer compositions which have been stabilized with a metal-containing heat stabilizer and a mercapto ester. In still another aspect, the invention relates to a method for stabilizing vinyl halide polymer compositions against heat in which part of the metal-containing heat stabilizer normally used is replaced by a mercapto ester.

The vinyl halide compositions described herein, in addition to being more resistant to heat and to shock, are also more stable to light than stabilized compositions not containing the mercapto ester.

The stabilizers described herein can be used with resins containing halogen; those can be homopolymers, for example polyvinyl chloride, polyvinylidene chloride, polychlorotrifluoroethylene, polytetrafluoroethylene, polychloroether, polydichlorostyrene, etc., co polymers such as polyvinyl acetate/chloride or other or combinations or various mixtures, for example polyvinyl chloride copolymerized with ethylene and/or with propylene, acrylonitrile-butadiene-styrene, ethylene/vinyl acetate and similar polymers.

More generally, the stabilizers are used with vinyl halide polymers, a term that includes vinyl halide homopolymers, vinyl halide copolymers and polymer blends containing said homopolymers or copolymers. As vinyl halide homopolymers, vinyl halide copolymers and polymer blends containing vinyl halide homopolymers or vinyl halide copolymers usable in the practice of this invention there may be used, for example, (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate and other alkyl acrylates, methyl methacrylate, ethyl methacrylate, butyl methacrylates, hydroxyethyl methacrylate and other alkyl methacrylates, methyl alpha chloroacrylate, styrene, vinyl ethers such as vinyl ethyl ether, vinyl chloroethyl ether, vinyl phenyl ether, vinyl ketones such as vinyl methyl ketone, vinyl phenyl ketone, 1 fluoro, 1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer and polyvinyl chloride and polyethylene and polymethyl methacrylate. Typical vinyl halide copolymers usable in this invention include vinyl chloride-vinyl acetate, vinyl chloridevinylidene chloride, vinyl chloridediethylfumarate, vinyl chloridetrichloroethylene and vinyl chloride-2 ethyl-hexyl acrylate. The polymer blends usable in the practice of this invention comprise physical blends of at least two distinct polymeric species and contain from 25 to 95 weight percent of vinyl halide homopolymer or vinyl halide copolymer. The vinyl halide copolymers usable in the practice of this invention are copolymers comprising from 25 to 95 mole percent vinyl halide units.

The benefits of this invention apply to both rigid and flexible vinyl halide polymers.

The Mercapto Ester

The mercapto ester employed herein is the reaction product of an optionally substituted mercaptohydrocarbylene-ol with a carboxylic acid. In one aspect, the resulting mercaptohydrocarbylene carboxylate has the formula where $R^1$ and $R^2$ each independently is optionally substituted hydrocarbylene; G is hydrogen, carboxy or where $R^3$ is optionally substituted hydrocarbylene.

In one embodiment, $R^1$ and $R^3$, each independently is alkylene of 2 to 20 carbon atoms, $R^2$ is alkylene of 1 to 20 carbon atoms and $R^1$, $R^2$ and $R^3$ each independently is alkenylene of 2 to 20 carbon atoms, cycloalkylene of 3 to 8 carbon atoms, arylene of 6 to 20 carbon atoms, alkarylene of 7 to 40 carbon atoms or aralkylene of 7 to 40 carbon atoms. $R^1$, $R^2$ and $R^3$ can be unsubstituted or substituted by non-interfering groups, such as hydroxy, alkoxy of 1 to 20 carbon atoms, oxo, oxirane, alkoxycarbonyl of 2 to 20 carbon atoms, aryloxycarbonyl of 7 to 20 carbon atoms, acyl of 2 to 40 carbon atoms, acyloxy of 2 to 20 carbon atoms, chloro, bromo, iodo, fluoro, cyano, alkylamido of 2 to 20 carbon atoms, mercapto, alkythio of 1 to 20 carbon atoms, alkylsulfamyl of 1 to 20 carbon atoms, alkylsulfonyl of 1 to 20 carbon atoms, and by alkyl, aryl, alkenyl, cycloalkyl as previously defined. $R^1$, $R^2$ and $R^3$ as well as their substituents can also include oxygen atoms in the chain, to provide, for example, poly(alkylene oxide) chains such as polyethylene oxide and polypropylene oxide, to provide ether groups and to provide linear polyester groups; there can also be sulfur atoms in the chains, to provide groups such as poly(alkylene sulfide) and alkylene disulfide; there can also be nitrogen atoms in the chain to provide groups such as poly(alkylene amide), aromatic amines, tertiary amines and heterocyclic nitrogen groups.

When G is hydrogen, the structure of the ester can be written:

where $R^1$ and $R^2$ are as defined. Conveniently, in this embodiment, $R^2$ is the residue of an organic monocarboxylic acid, such as acetic, propionic, acrylic, methacrylic, butyric, hexanoic, octanoic, decanoic, dodecanoic, oleic, linoleic, stearic, palmitic, abietic, montanic, myristic, benzoic and phenylacetic acids and so $R_2$ can be alkyl of 1 to 20 carbon atoms, alkenyl of 2 to 20 carbon atoms, or said alkyl or alkenyl substituted as described. Preferably, $R^2$ contains from 8 to 20 carbon atoms and objectionable odors are minimized or elimiminated when $R^2$ contains from 12 to 20 carbon atoms, an embodiment illustrated when $R^2$ is stearyl, oleyl, myristyl, palmityl or mixtures thereof, as well as with mixtures of fatty acids known as "tall oil" fatty acids, and other acids derived from plant and animal sources.

When G is the structure of the ester can be written and it is apparent that in this embodiment, $R^2$ is generally the residue of an organic dicarboxylic acid. Thus, $R_2$ can be a covalent bond or alkylene of 1 to 20 carbon atoms, alkenylene of 2 to 20 carbon atoms, arylene of 6 to 20 carbon atoms, cycloalkylene or cycloalkenylene of 3 to 20 carbon atoms, or said alkylene, alkenylene or arylene, cycloalkylene or cycloalkenylene substituted as described. In this embodiment, $R^2$ is illustrated by the dicarboxylic acids: oxalic, malonic, succinic, glutaric, adipic, pimelic, suberic, azelaic, sebacic, the isomeric phthalic acids and phenylenediacetic acid.

The mercapto ester can also be embodied in the reaction product of a mercapto group with an ethylenically unsaturated group; for example an unsaturated mercapto ester, such as is formed with an unsaturated acid like linoleic acid, can react with another mercapto group via the unsaturated double bond.

The acid component can be an acid-capped polyether, such as polypropylene oxide having up to about 2500 repeating propylene oxide units in the chain, capped with an aromatic or aliphatic dicarboxylic acid or hydroxy (oxy) carboxylic acid. Such polyethers are commercially available from a variety of sources. Useful polyethers will have a molecular weight of 200 to 20,000 and will be liquids or low-melting waxes. Similarly, one can employ an acid-capped polyester as the acid component.

One can also use an acid capped silicone ester obtained by reacting a silane such as -alkoxy silane with a polyol to form a silicon-containing polyether and capping with a hydroxycarboxylic acid or dicarboxylic acid. There can also be used an acid-capped polyamide obtained from a diamine and a diacid; one can also use an amino acid such as β-amino crotonic acid as the acid component.

The acid component can comprise one or more natural fatty acids, such as are present in peanut oil, tall oil, safflower oil, soybean oil, tallow lanolin, palm oil and coconut oil. It can comprise a polyfunctional acid such as trimer acid, citric acid, diethylene triamine pentaacetic acid and itaconic acid; it can comprise an unsaturated acid such as acrylic, methacrylic, crotonic and maleic acids. The acid component can comprise an aromatic acid, such as phthalic, terephthatic, benzoic, cinnamic, salicylic and anisic acids. The acid can be a heterocyclic acid such as pyridine carboxylic acid, thiophene carboxylic acid, furan carboxylic acid and phenyl indole carboxylic acid.

The acid component can be an amino acid, such as alanine, tryptophan, glutamic acid and glutamine; it can be a polyhydroxy acid such as gluconic, tartaric and ascorbic acids; it can be a thioacid or dithioacid, such as dithiopropionic acid; it can be a sulfamido carboxylic acid.

The acid component can also contain one or more functional sites, such as CN, $COOR^a$, $COONR^bR^c$, $COONR^d$ $(CH_2)_nOH$ where $R^a$, $R^b$, $R^c$ and $R^d$ are optionally substituted hydrocarbylene, as previously defined.

As indicated, $R^1$ and $R^3$ can be hydrocarbyl, as defined. Since a simple way of preparing these esters is to react a mercaptoalkanol with a carboxylic acid, and since mercaptoalkanols are readily available, $R^1$ and $R^3$ can conveniently be the residues of a mercaptoalkanol. Thus, $R^1$ and $R^3$ can be alkylene of 2 to 20 carbon atoms and can be substituted by non-interfering groups, as indicated. $R^1$ and $R^3$ will generally contain from 2 to 12 carbon atoms. In this embodiment, $R^1$ and $R^3$ are derived from compounds such as:

β-mercaptoethanol
γ-mercaptopropanol
thioglycerol
4-mercapto-1-butanol
1-thiosorbitol Preferably $R^1$ and $R^3$ are the residues of mercaptoloweralkanols and so $R^1$ and $R^3$ are preferably lower alkylene or hydroxyloweralkylene.

Also preferred is the case where $R^1$ and $R^3$ are hydroxy-substituted alkylene where the hydroxyl group is located beta-, gamma-, delta- or epsilon- to the mercapto group. For reasons of cost and availability, $R_1$ and $R_3$ are preferably ethylene or 2-hydroxypropylene.

$R^1$ and $R^3$ can be linear or branched and can be interrupted in the chain by one or more of oxygen, sulfur and nitrogen. For example, $R^1$ and $R^3$, or the branching, can be a poly(alkylene oxide), a poly(alkylene sulfide), an alkylene disulfide, or an alkylene amide.

Esters are conveniently prepared by reacting the desired carboxylic acid or a mixture of two or more acids with a stoichiometric amount of one or more mercaptoalcohols. The reaction is conveniently conducted at elevated temperatures in the presence of an esterification catalyst, for example p-toluenesulfonic acid, and an organic liquid diluent. The diluent can be an aromatic hydrocarbon such as benzene, toluene or xylene and the reaction mixture is heated at the boiling point until substantially all of the water formed as a by-product of the esterification reaction is removed by azeotropic distillation. The water can be collected in a suitable receiver such as a Dean-Stark trap.

It is known that esterification reactions involve an equilibrium that can be represented by the following equation:

Removal of the water will displace the equilibrium in favor of ester formation. If desired, one can use a mixture of ester and fatty acids.

The mercapto esters can be employed individually or in combination. Good results have been obtained with the mixed esters derived from a mercaptoalkanol of 2 to 6 carbon atoms and tall oil fatty acids as well as with a mixture of stearic and palmitic acids.

Thus, contrary to the various mercapto esters of the prior art in which the —SH function is located in the acid residue, the mercapto esters according to the invention are characterized in that they carry their mercapto group in the alcohol residue. It is surprising that due to this difference of the position of —SH the activity of the ester vis-a-vis tin stabilizers is profoundly modified to the point of suppressing the disadvantages noted above and providing a remarkable efficacy. There are in addition the advantages of the ease of preparation and purification of these bodies. Generally, the more the molecular weight of the ester is raised and the lower the vapor pressure of the compound, the lower is any risk of odor.

Because of ease of mixing, the preferred mercapto esters employed herein are liquids, such as 2-mercaptoethyloleate and 2-mercaptoethyllinoleate; however good results in respect of stabilization have been obtained with solid esters, such as 2-mercaptoethylstearate.

The Metal-containing Stabilizer

The metal-containing stabilizers useful herein are well-known for their ability to prevent formation of, or react with and neutralize, the hydrogen halide evolved when vinyl halide polymers are heated to processing temperatures. The progressive elimination of hydrogen halide from the polymerization chain ("unzipping") yields a polyene chain which is believed to be at least partially responsible for the discoloration that occurs during heating of the polymer.

These conventional, well known metal-containing heat stabilizers for vinyl halide polymers include compounds of the elements of groups IIA and IIB of the Periodic Table of the Elements, as well as compounds of tin, lead, bismuth and antimony (trivalent). Conventional well-known heat stabilizers for vinyl chloride polymers are discussed in Chapter 9 of the Encyclopedia of PVC, edited by L. I. Nass (M. Dekker, New York, 1976), incorporated herein by reference. More generally used metals are calcium, barium, zinc, tin and trivalent antimony.

One class of metal compounds that is particularly effective comprises the mono- and diorgano-derivatives of tetravalent tin wherein the remaining valences of the tin atom are satisfied by bonds to halogen, oxygen, phosphorous and/or sulfur and/or a residue resulting from 1) removal of the hydrogen atom from the oxygen atom of a carboxylic acid, an alcohol or a polyol; or

2) removal of the hydrogen atom from the sulfur atom of a mercaptan, mercaptoacid, mercaptoalcohol, mercaptoacid ester or mercaptoalcohol ester.

Oxygen may or may not be present; however, when present it is bonded only to one or more of tin, carbon, hydrogen or phosphorus.

The well-known members of this class include the organotin oxides, sulfides, carboxylates, mercaptides, derivatives of mercaptoacids, derivatives of mercaptoalcohols and the mercaptoacid and mercaptoalcohol esters. They can be represented by the formulae

(R$^4$SnZ$_{1.5}$)$_x$

(R$^4$)$_2$SnZ

(R$^4$)$_a$Sn(OOCR$^5$)$_{4-a}$

(R$^4$)$_a$Sn(SR$^6$)$_{4-a}$

[R$^4$SnSR$^6$]$_2$(Z$'_b$)$_2$

[(R$^4$)$_2$SnSR$^6$]$_2$Z$'_b$

[(R$^4$)$_a$Sn]$_2$(OOCR$^5$COO)$_{4-a}$

[(R$^4$)$_a$Sn]$_2$(ZR$^6$Z)$_{4-a}$

[(R$^4$)$_a$Sn]$_2$(ZR$^6$COO)$_{4-a}$ where
  a is 1 or 2;
  x is an integer from 3 to 20, inclusive;
  Z is oxygen or sulfur;
  Z' is oxygen or sulfur;
  b is an integer from 1 to 4 when Z' is sulfur and is 1 when Z' is oxygen;
  R$^4$, R$^5$ and R$^6$ each independently is substituted or unsubstituted hydrocarbyl, and R$^6$ additionally can be —R$^7$—COOR$^8$ or —R$^9$—OOCR$^8$ where R$^7$ is C$_1$–C$_{20}$ alkylene, or R$^6$ can be H or R$^1$;
  R$^8$ is hydrocarbyl; and
  R$^9$ is C$_2$–C$_{20}$ alkylene.

The metal-containing compound, in one well-known embodiment, comprises the reaction product of a monoorganotin trihalide, a diorganotin dihalide or mixture thereof with an alkali metal sulfide and one or more of a monocarboxylic acid, a polycarboxylic acid, a mercaptan, a mercaptoacid, a mercaptoalcohol, a mercaptoacid ester and a mercaptoalcohol ester.

Representative tin compounds that are used include
  dibutyltin maleate
  dibutyltin di(stearyl maleate)
  [monobutyltin(isooctylmercaptoacetate)-sulfide]
  monobutyltin(dodecylmercaptide)sulfide
  monobutyltin (mercaptoethyloleate)sulfide
  monobutyltin trimercaptoethyloleate
  monobutyltin(tri(hydroxyethylmercaptide)(sulfide)
  [monobutyltin(mercaptoethyloleate)(sulfide)]
and bridged sulfur compounds of formula where
  A and A$^1$ are alkyl of 1 to 12 carbon atoms, such as butyl and octyl,
  A$^2$, A$^3$, A$^4$ and A$^5$ are lower alkylene such as ethylene,
  D, D$^1$, D$^2$ and D$^3$ each independently, is OH,  —OC(=O)—(C$_8$–C$_{20}$ alkyl),  —(C$_6$–C$_{18}$) alkyl,  or D and D$^1$, or D$^2$ and D$^3$ together form the group —OC(=O)—C$_m$H$_{2m}$—C(=O)O— where m is a number from 0 to 8.

The mercapto esters also give excellent results in stabilizing vinyl halide resins when stabilizers other than those based on tin are used. Systems such as those derived from alkali metal (sodium, potassium), alkaline earth metals (calcium, barium) and other metals, such as magnesium, zinc, stannous tin, lead, antimony or their mixtures or with various other additives are particularly suitable. These additives can be in particular the epoxides, β-diketones, such as, for example epoxidized soya oil, phosphites, phosphonates, triphenyl phosphites and antioxidants such as tert-butyl catechol and others.

The metal containing compound can be the barium, calcium, lead, magnesium, potassium, tin (including Sn$^{++}$) or zinc salt of a carboxylic acid, a phenol, sulfuric acid or phosphoric acid. When using alkali or alkaline earth metals and/or zinc, the metal derivatives which are particularly suitable are the carboxylates. Reference can be made in a non-limitative matter to the laurate, stearate, benzoate, caproate, caprylate, 2-ethyl-hexanoate, naphthenate, neoalkanoate and oleate. However, a certain number of derivatives such as the carbonate, oxide and sulphate can also be advantageously used.

When antimony is chosen as the metal, useful results are obtained when the mercapto esters are employed in con- junction with antimony trimercaptides, these trimercaptides being derived desirably from aliphatic mercaptans, esters of mercapto-acids or esters of mercapto-alkyls.

The metal-containing stabilizer component can be a single compound or can be a combination of compounds. The metal-containing stabilizer component will generally be present in an amount to provide up to about 0.5 parts of metal per 100 parts of polymer; lead is typically used in greater amounts, as high as 2 to 4 parts of metal per 100 parts of resin.

The Combination of Mercapto Ester and Metal-containing Stabilizer

The mercapto esters useful herein impart little, if any, stability to vinyl halide polymers by themselves. It is therefore surprising that they can be used to replace a substantial part of a conventional metal-containing heat stabilizer used with vinyl halide polymers and that the resulting stabilized polymer composition, containing reduced amount of metal-containing stabilizer, displays heat stability comparable to same composition containing a far greater concentration of metal-containing stabilizer.

The amount of metal-containing stabilizer employed will vary, depending on a number of factors, such as molecular weight, valence utility of the metal atom, type of equipment and degree of performance. The valence utility of a metal can be demonstrated in its ability to neutralize HCl. Thus, $RSn(SR)_3$ has three valence sites capable of reaction:

Zinc has two valence sites

Similarly, a diorganotin has two valence sites.

Single screw extruders generally require higher stabilizer levels.

Stabilizers containing from 9% to 18% by weight of tin typically will be used in an amount of from 0.35 to 0.5 parts by weight of stabilizer per 100 parts of polymer for pipe applications and from 0.8 to 1.5 parts by weight of stabilizer per 100 parts of polymer for profile applications. Thus, there are used from 0.03 parts to 0.3 parts by weight of tin per 100 parts by weight of polymer. In the presence of the mercaptoester, which can be present in an amount of from 2 to 25 times the amount of metal, the tin content can be reduced by from 20% to 90%. Thus, there can be present 0.003 to 0.25 parts by weight of tin and 0.006 to 6.5 parts by weight of mercaptoester per 100 parts of polymer. More generally, there can be used ⅓ less metal when the mercaptoester is present; thus, there can be present from 0.02 to 0.25 parts of tin and from 0.06 to 6.5 parts by weight of mercaptoester.

Stabilizers containing calcium and zinc are generally used in combination to maximize performance efficiency. Thus, a combination stabilizer containing 0.2 to 0.4 parts by weight of a calcium-containing stabilizer and 0.1 to 0.2 parts by weight of a zinc containing stabilizer per 100 parts of polymer are employed. Here too, the amount of combination stabilizer can be reduced by 20% to 50% in the presence of the mercaptoester while providing equivalent or superior performance to that obtained with the higher metal content.

The metal-containing stabilizer and/or the mercaptoester can be incorporated into the polymer in proportions which can range from 0.01 to 5% by weight of the resin employed. The mercapto ester can be utilized in proportions ranging from 0.05 to 5% by weight of the resin, in particular from 0.1 to 2%.

While the ingredients can be added to a polymer composition separately, it is more convenient to formulate a mixture of metal-containing stabilizer and mercaptoester for addition to the polymer. Optimum ratios of metal-containing stabilizer and mercaptoester can be determined, based on a given stabilizer, the polymer and the desired performance and cost.

The results obtained with a tin-containing stabilizer and a mercaptoester can be further improved by the presence of a monoorganotin halide such as the trihalide, dihydroxy halide, hydroxy dihalide or sulfur dihalide of general formula where the organo group is hydrocay of 1 to 20 carbon atoms and halogen is Cl, Br or I. Because of cost and availability, the monoalkyltin trihalides are preferred, notably those where the alkyl group contains 1 to 8 carbon atoms and the halogen is chlorine. The monoorganotin trihalide can comprise up to about ⅓ of the total weight of the metal-containing stabilizer component.

The addition of the mercaptoester permits very substantial reduction in the quantity required for the metal-containing stabilizer, which constitutes a considerable savings, reflected in a cost benefit to the user. For example, this savings can range from 20 to 90% of the quantity of tin normally used with respect to stabilization of vinyl halide polymers.

The mercapto ester, in the absence of the metal-containing stabilizer, provides no protection against discoloration or viscosity increase of the polymer during thermal processing; however, when combined with the metal-containing stabilizer, a level of performance is achieved that is equal to or greater than that obtained with a higher usage of metal-containing stabilizer. Further, the metal-containing stabilizer, when used alone, but at the low levels employed with the mercaptoester, is significantly poorer in performance; the resin discolors significantly. The results change dramatically in the presence of the mercaptoester.

The invention is further illustrated by the examples.

All parts and percentages are by weight unless otherwise indicated.

EXAMPLE I

Synthesis of mercaptoethyl stearate, $CH_3(CH_2)_{16}COOCH_2CH_2SH$

A one liter capacity reactor equipped with a mechanically operated agitator, thermometer, water-cooled condenser and Dean-Stark trap was charged with 284 g. (1 mole) of stearic acid, 86 g. (1.1 mole) of 2-mercaptoethanol, 0.8 g. p-toluenesulfonic acid and 200 cc. of benzene. The contents of the reactor were heated to the boiling point for six hours under a nitrogen atmosphere, during which time the temperature of the liquid was maintained below 100° C. Following the addition of 200 cc. of benzene the reaction mixture was cooled to ambient temperature, at which time it extracted with two 200 cc. portion of water. The benzene and other volatiles were then evaporated under reduced pressure, leaving 30 g. of crude 2-mercaptoethyl stearate as a residue. This product was found to contain 9.2% by weight of mercapto (—SH) groups. The calculated value for the expected product is 9.6%.

EXAMPLE II

Synthesis of 3-thioglyceryl myristate

The procedure described in Example I was repeated using 228 g. (1 mole) of myristic acid, 216 g. (2 moles) of 3-thioglycerol, 2 g. of p-toluenesulfonic acid and 500 cc. benzene. In this instance heating of the reaction mixture was discontinued when one mole of water was collected in the Dean-Stark trap. The reaction mixture was then extracted using 500 cc. portions of water. Evaporation of the benzene under reduced pressure yielded 322 g. of crude 3-thioglyceryl myristate. This material was found to contain 8.4% by weight of mercapto groups, compared with 10.4% for the expected product.

EXAMPLE III

This example demonstrates that the addition of 2-mercaptoethyl stearate reduces the amount of a conventional organotin stabilizer required to impart the same level of heat stability to a vinyl chloride homopolymer.

A mixture having the following composition was blended on a roller mill heated to a temperature of 180° C. for a period of time specified in the accompanying Table I.

100 parts of vinyl chloride homopolymer
(Lacvyl S/071/S, K value=56)
0.5 part montan wax (E wax)
Stabilizer as specified in Table I.

The stabilizer employed was di-n-octyltin-S, S-bis-(isooctyl mercaptoacetate) and the ester was 2-mercaptoethyl stearate (MES). The time interval (in minutes) between placing of the ingredients on the mill and a) observation of initial discoloration and b) degradation of the sample to a brown color are recorded in Table I.

TABLE I

| | | Discoloration | |
|---|---|---|---|
| % Tin Compound | % MES | Initial | Browning |
| 0.07 | — | 2' | 3' |
| 0.25 | — | 4' | 9' |
| 0.35 | — | 7' | 12' |
| 0.70 | — | 11' | 25' |
| 0.07 | 1.00 | 4' | 9' |

The preceding data demonstrate that stabilization is a direct function of metal content and that the addition of 1% of the mercapto ester and 0.07% of the organotin compound to the polymer formulation delays both initial discoloration and browning to the same extent as 0.25% of the organotin compound without any ester. A reduction of 72% in the weight of organotin compound is achieved by replacing it with a considerably less expensive mercapto ester.

EXAMPLE IV

This example demonstrates that the addition of 2-mercaptoethyl stearate (MES) reduces the amount of a conventional mixed organotin stabilizer required to achieve a comparable level of heat stability.

The following stabilizer compositions were evaluated for heat stability using the test procedure and base formulation described in Example III. The organotin stabilizer was a condensation product of butyl stannoic acid and butyl thiostannoic acid, and was prepared in accordance with Example 6 of Belgian Patent No. 568,054 issued May 27, 1958.

TABLE II

| | | Discoloration | |
|---|---|---|---|
| % Tin Compound | % MES | Initial | Browning |
| 0.1 | — | 8' | 12' |
| 0.1 | 1.00 | 16' | 25' |
| 0.02 | — | 4' | 6' |
| 0.02 | 1.00 | 7' | 12' |
| — | 1.20 | immediate | 3' |

The foregoing data demonstrate that the heat stability imparted by the combination of 0.02% of the tin compound and 1.00% of the mercapto ester is comparable to that of a composition containing 0.1% of the tin compound and no ester. A reduction of 80% in the amount of tin compound is thereby achieved, which more than offsets the cost of the mercaptoethyl stearate required to obtain this effect. The data also demonstrates that mercaptoethyl stearate has virtually no independent effect in reducing the discoloration rate of polyvinyl chloride at conventional processing temperatures.

EXAMPLE V

The evaluation procedure described in Example III was repeated using butyl stannoic acid as the tin compound and 2-mercaptoethyl stearate (MES) as the ester.

TABLE III

| | | Discoloration | |
|---|---|---|---|
| % Tin Compound | % MES | Initial | Browning |
| 0.05 | — | immediate | 10' |
| 0.05 | 1.00 | 12' | 25' |

These data demonstrate that while butyl stannoic acid is a relatively poor stabilizer, the addition of 1.00% of MES increased the level of heat stability imparted by 0.05% of the tin compound to the level achieved using 0.7% of the considerably superior tin stabilizer disclosed in the preceding Example III.

EXAMPLE VI

The evaluation described in Example V was repeated using 3-thioglyceryl myristate at a level of 1.00% and butylstannoic acid at a level of 0.05%. Initial discoloration was observed after 5 minutes of milling and browning after 12 minutes. This is comparable to the values for the stabilizer of Example III at a level of 0.35%.

EXAMPLE VII

This example demonstrates the increase in stability and reduction in melt viscosity of vinyl chloride polymers achieved using a stabilizer composition of this invention. The formulation exhibited the following composition:

|  | Parts (by wt.) |
| --- | --- |
| Vinyl chloride homopolymer | 100 |
| Calcium carbonate | 3 |
| Titanium dioxide | 1 |
| Montan wax ("E" wax) | 0.8 |
| Stabilizer | as indicated below |

The fusion time, heat stability and melt viscosity of the polymer composition were determined using a torque rheometer. The bowl of the rheometer was maintained at a temperature of 200° C., the speed of the blades was maintained constant at 60 revolutions per minute and the torque (in meter kilograms) required to rotate the blades was recorded on a graph using time as the abscissa. Heat stability is expressed as the duration of the time period (in minutes) between fusion and the onset of crosslinking, as evidenced by an increase in the slope of the torque vs. time plot. The torque value reaches a plateau at the time of fusion and remains relatively constant between fusion and the initiation of cross-linking. A portion of the graphs obtained from the torque rheometer are reproduced in the Drawings. The plots begin at two minutes following introduction of the polymer formulation into the torque rheometer.

Figure 1:
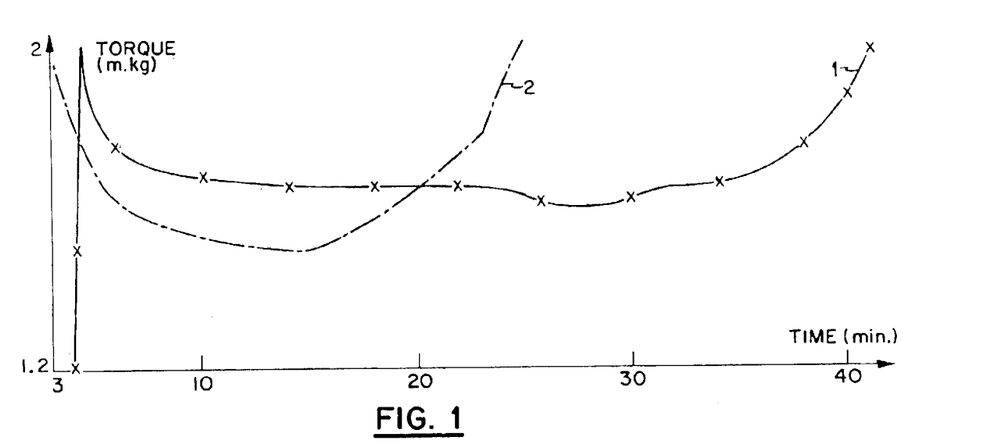
FIGS. 1 and 2 are reproductions of the plots obtained from the recorder of a torque rheometer containing the polymer samples described in Example VII.

In FIG. 1 the torque vs. time plots for the aforementioned polymer composition containing 0.9 or 1.8 parts of a mixture of 0.5 moles butylthiostannoic acid and 1.5 moles di-n-butyltin-S,S'-bis(isodecyl mercaptoacetate) as the sole stabilizer are presented. Curve 1 represents the composition containing 1.8 parts of stabilizer and Curve 2 represents the composition containing 0.9 parts of stabilizer.

FIG. 1 illustrates the proposition that stabilization is directly proportional to the amount of tin compound present; the torque value remains relatively constant for a considerably longer period of time for the composition containing 1.8% of stabilizer than for the composition containing 0.9% stabilizer.

Figure 2:
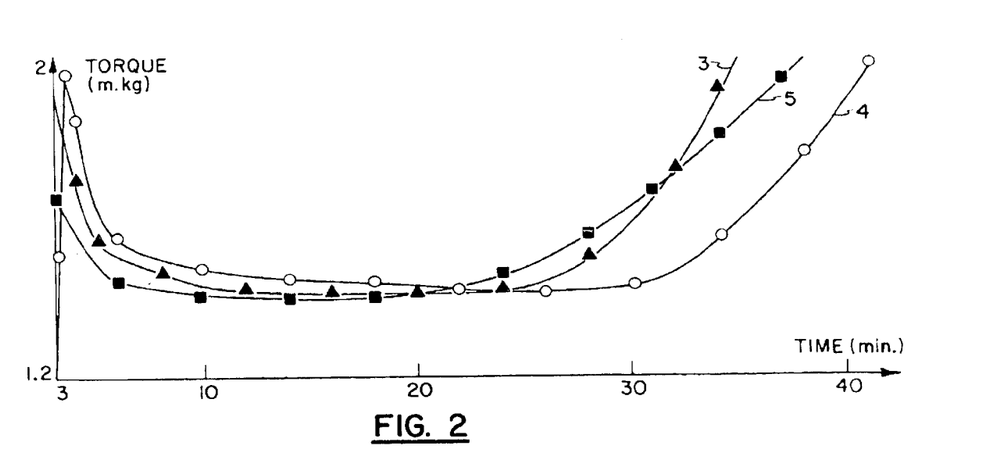

FIG. 2 contains three curves corresponding to the aforementioned base polymer composition and the following amounts of tin compounds and 2-mercaptoethyl. stearate (MES):

|  | Tin Compounds (parts) | MES (parts) |
| --- | --- | --- |
| Curve 3 | 0.90 | 1.0 |
| Curve 4 | 0.90 | 2.0 |
| Curve 5 | .45 | 2.0 |

From FIG. 2 it is seen that curves 3 and 5 are approximately equivalent; curve 5 represents a formulation containing half as much of the tin compound as the formulation of curve 3. It is also seen that the best results are obtained with the formulation of curve 4, which contains the same tin content as the formulation of curve 5.

A further observation should be made. When one compares the data presented in FIGS. 1 and 2 it is seen that the melt viscosity, as measured by the amount of torque required to maintain a rotational speed of 60 r.p.m., is appreciably lower for the formulations containing the mercapto ester (curves 3, 4 and 5). This reduction in the melt viscosity is attended by two important advantages; first, less power is required to process the molten polymer and second, the processing rate is increased, resulting in greater productivity per unit of time. It is also graphically illustrated in curves 2 and 3, 4 and 5 that the addition of a mercapto ester has a pronounced effect on stability.

Similar beneficial effects on stability and melt viscosity were obtained using 1% and 2% of 2-mercaptoethyl palmitate and 2-mercaptoethyl myristate in place of the 2-mercaptoethyl stearate.

EXAMPLE VIII

This example demonstrates that a diorganotin compound without any monoorganotin compound can be employed in combination with a mercapto ester to achieve stabilization as well as a reduction in both melt viscosity; the amount of tin compound required to achieve a given level of heat stability is also reduced.

Figure 3:
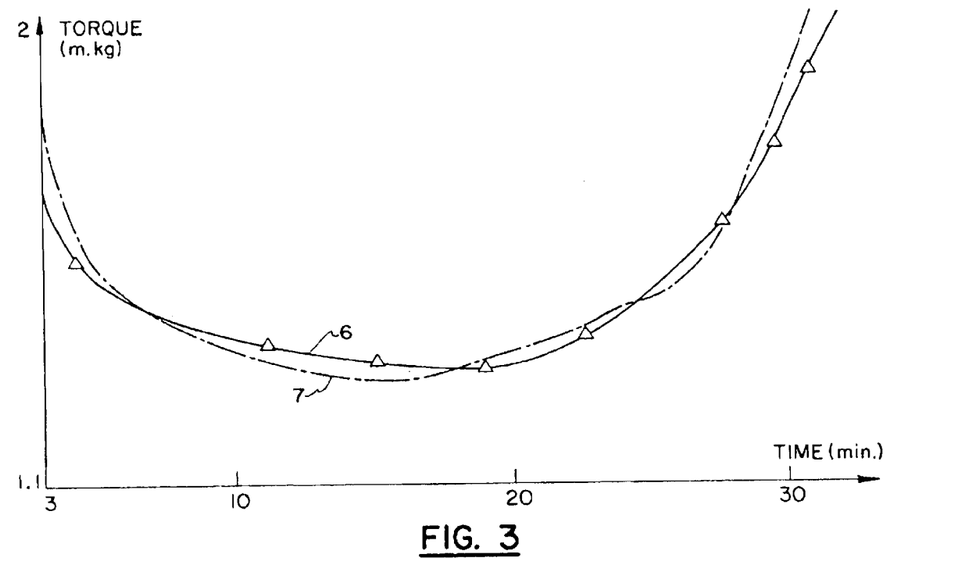
FIGS. 3 and 4 are reproductions of the plots obtained from the recorder of a torque. rheometer containing the polymer samples described in Example VIII and IX, respectively.

Curve 6 in FIG. 3 depicts a portion of the torque rheometer plot for the base formulation of Example VII containing 2.2%, based on polymer weight, of di-n-butyltin-S,S'-bis (isooctyl mercaptoacetate). Curve 7 is a portion of the torque rheometer curve for a composition containing the same base formulation as Curve 6, 1.1% of di-n-butyltin-S,S'-bis (isooctyl mercaptoacetate) and 1% of 2-mercaptoethyl stearate. The two curves are virtually identical, demonstrating that the addition of the mercapto ester permits a 50% reduction in the amount of organotin compound required to achieve comparable stability.

EXAMPLE IX

Three vinyl chloride polymer compositions containing the base formulation described in Example VII and the conventional organotin stabilizer disclosed in Example IV, identified as a condensation of butylstannoic acid and butylthiostannoic acid, were evaluated using a torque rheometer. A portion of the plots obtained from the rheometer recorder appear in the accompanying FIG. 4.

Figure 4:
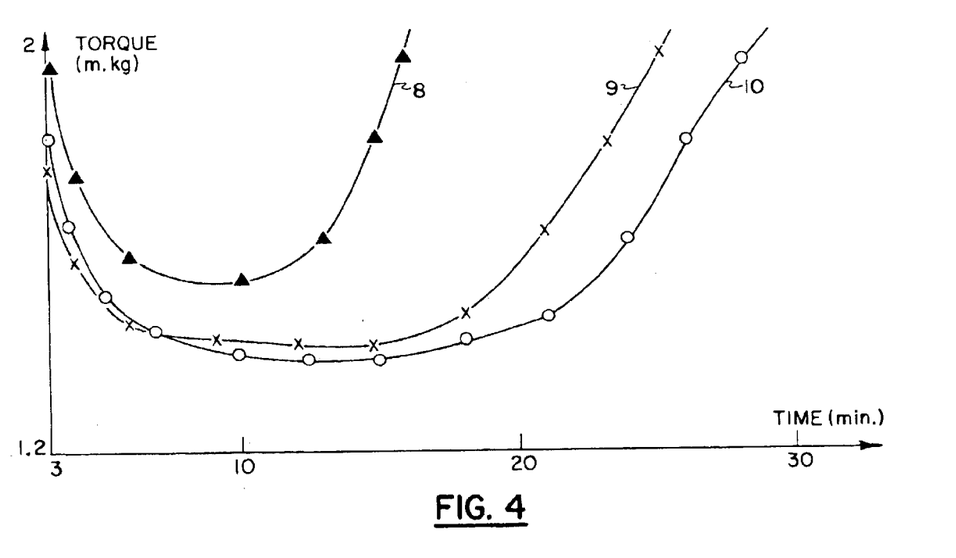

| Curve No. | Tin Compound (%) | Mercaptoethyl stearate (MES) (%) |
| --- | --- | --- |
| 8 | 0.37 | 0 |
| 9 | 0.37 | 1 |
| 10 | 0.19 | 2 |

It is evident from an examination of these three curves that the addition of 1% MES substantially increased the stability and lowered the melt viscosity of the formulation. The combination of 2% MES with 0.19% tin compound provides reduction in melt viscosity and stabilization superior to those achieved at 0.37% tin compound and 1.0% MES.

EXAMPLE X

This example demonstrates that the level of stability achieved using a mercapto ester in combination with an organotin compound cannot be achieved using a mercaptan or a mercaptoacid ester containing a similar number of carbon atoms.

A. The following tin compound was prepared, comprising a reaction product of butyltin trichloride, isooctyl mercaptoacetate and sodium sulfide in equimolar amounts. The compound was prepared by adding butyltin trichloride to aqueous ammonia (29% NH$_3$). 0.9 mole of ammonia was employed for each mole of butyltin trichloride and the temperature was maintained below 55° C. during the addition. Isooctyl mercaptoacetate was then added while the reaction mixture was maintained below 60° C. The reaction mixture was then heated at a temperature of from 50 to 60° C. for ½ hour, at which time the solid sodium sulfide was added over a one hour period. The reaction mixture was then stirred for ½ hour, at which time the pH was adjusted to between 4 and 6 using aqueous ammonia. The water present in the organic phase of the resultant two-phase mixture was then removed under reduced pressure and the aqueous phase discarded. The organic phase was then filtered to remove solid material and the filtrate employed as a stabilizer without further purification. The tin content of the product is typically from 27.5 to 30.3%.

B. The formulation of Example III was prepared; the concentrations of the organotin compound and the sulfur compound were 0.1 part and 1.0 part by weight, respectively, per 100 parts of vinyl chloride polymer. The sulfur compounds evaluated were 2-mercaptoethyl stearate, stearyl mercaptoacetate and stearyl mercaptan, the latter two sulfur compounds being employed as controls. The resultant formulations were blended on a 2-roll mill wherein the rollers were heated to a temperature of 190° C. Samples were taken from the three resultant sheets at identical one, two or five minute intervals, depending upon the length of time the sample had been on the mill. The polymer sample containing 2-mercaptoethyl stearate did not exhibit any noticeable discoloration until the 25 minute interval. By comparison, the sample containing stearyl mercaptoacetate had discolored after 10 minutes on the mill. After 20 minutes the sample containing stearyl mercaptan had discolored to the same extent as a sample containing 2-mercaptoethyl stearate that had been processed on the mill for 25 minutes.

TABLE IV

|  | Time to Discolor |
|---|---|
| 2-mercaptoethyl stearate | 25' |
| stearyl mercaptan | 10' |
| stearyl mercaptoacetate | 20' |

EXAMPLE XI

This example demonstrates that the stability imparted to a vinyl chloride polymer formulation by a mixture of calcium and zinc stearate and, optionally, an epoxidized oil, is improved by the addition of a mercapto ester.

The base formulation contained 100 parts of the vinyl chloride homopolymer employed in Example III, 0.5 part of a montan wax ("E" wax), 0.6 part of calcium stearate and 0.4 part of zinc stearate. The formulation was blended for five minutes on a 2-roll mill wherein the rollers were heated to a temperature of 180° C. Samples measuring 2 cm.×1 cm. were cut from the resultant sheet, placed in a thermostatically controlled oven at a temperature of 204° C. and withdrawn every five minutes, at which time the color of the samples were noted. The results of this evaluation are recorded below.

Base Formulation

| Residence time @ 204° C. (in min.) | 0 | 5 | 10 |
|---|---|---|---|
| Color | red | yellow | black |

Base Formulation+2% mercaptoethyl stearate (based on polymer)

| Residence time @ 204° C. (in min.) | 0 | 5 | 10 |
|---|---|---|---|
| Color | clear colorless | very slight yellow | black |

The initial color of the samples and the color following five minutes of heating in the oven are substantially improved by the addition of the mercapto ester.

When 4 parts of an epoxidized soya oil (ESO) were added to the foregoing base formulation the following color ratings were obtained:

Base formulation+4% ESO (based on polymer)

| Residence time @ 204° C. (in min.) | 0 | 5 | 10 | 15 | 20 |
|---|---|---|---|---|---|
| Color | red | yellow | yellow brown | brown | black |

Base Formulation+4% ESO+1% Mercaptoethyl Stearate (Based on Polymer)

| Residence time @ 204° C. (in min.) | 0 | 5 | 10 | 15 | 20 |
|---|---|---|---|---|---|
| Color | clear colorless | very slight yellow | slight yellow | yellow | black |

In all instances the colors of the initial milled sheet and a sheet exposed to 204° C. for 5 minutes were improved by the presence of the mercapto ester.

EXAMPLE XII

This example demonstrates the improved stabilization imparted by a mercapto ester to vinyl chloride polymers containing a conventional antimony stabilizer.

The evaluation procedure and base formulation described in the first part of Example XI were employed, substituting antimony tris(isooctyl mercaptoacetate) in place of the calcium and zinc stearates. The exposure times at 204° C. required for the formulations to achieve a clear yellow and a dark yellow color were determined and are recorded in the following table:

TABLE V

|  |  | Discoloration | |
|---|---|---|---|
| % Antimony Cpd. | % MES | clear yellow | dark yellow |
| .07 | — | 2' | 12' |
| .17 | — | 4' | 18' |
| .35 | — | 8' | 27' |
| .07 | 2.0 | 6' | 38' |
| .17 | 1.0 | 8' | 35' |

The data tabulated above indicates that the mercapto ester greatly enhances the stabilizing effect of an antimony compound in a vinyl chloride polymer. One can reduce the antimony content by 50% and obtain equal results; one can reduce the antimony content by 80% and obtain comparable results.

EXAMPLE XIII

This example illustrates the observation that the results obtained with a metal-containing stabilizer and a mercapto ester can be further improved by the presence of a monoorganotin trihalide.

Two stabilizers were prepared having the following composition:

| Stabilizer A | |
|---|---|
| Reaction product of Example X | 12.5 |
| Mercaptoethyl oleate | 55.0 |
| Mineral Oil | 32.5 |
| Stabilizer B | |
| Reaction product of Example X | 12.5 |
| Butyltin trichloride | 3.0 |
| Mercaptoethyl oleate | 55.0 |
| Mineral oil | 29.5 |

The polymer formulation employed to evaluate the stabilizers had the following composition:

| | Parts |
|---|---|
| Vinyl chloride homopolymer | 100.0 |
| Calcium carbonate | 3.0 |
| Titanium dioxide | 1.0 |
| Paraffin wax | 1.0 |
| Calcium stearate | 0.4 |
| Stabilizer A or B | 0.4 |

The formulations were fabricated into sheets using a roll mill heated to a temperature of 177° C. The sheets were removed from the mill after five minutes and then compression molded at the same temperature for ten minutes at a pressure of 3,500 kg./cm.$^2$. The whiteness index (W.I.) and yellowness index (Y.I.) of the molded samples were measured using a Macbeth MC1500S colorimeter. The data are recorded in Table VI.

TABLE VI

| Stabilizer | W.I. | Y.I. |
|---|---|---|
| A | 38.9 | 13.8 |
| B | 44.0 | 12.2 |

The formulation with Stabilizer B, which contained butyltin trichloride, was whiter (higher W.I. value) than the formulation with Stabilizer A.

EXAMPLE XIV

This example illustrates the proposition that various mercaptans, having the same number of carbon atoms, are not equivalent in their performance.

The following mercaptans were compared:

(1) lauryl mercaptan, $C_{12}H_{25}SH$
(2) n-decylmercaptoacetate, $HSCH_2COOC_{10}H_{21}$
(3) 2-mercaptoethyl decanoate, $C_9H_{19}COOCH_2CH_2SH$ A. The following test formulation was prepared:

| Vinyl chloride homopolymer | 100.0 |
|---|---|
| Calcium carbonate | 3.0 |
| Titanium dioxide | 1.0 |
| Calcium Stearate | 0.4 |
| Paraffin wax | 1.0 |
| Stabilizer | 0.42 |

Sheets were prepared on a roll mill at 350° F. after five (5) minutes milling and then compression molded at 350° F. for ten (10) minutes. Readings of the Whitness Index (W.I.) and Yellowness Index (Y.I.) were directly obtained from a Macbeth MC 1500S calorimeter.

The metal-containing stabilizer component was monobutyltin(dodecylmercaptide)sulfide of formula The results are tabulated below.

| % Tin Cpd. | % Mercapto Cpd. | W.I. | Y.I. |
|---|---|---|---|
| 0.4 | — | 54.9 | 8.6 |
| 0.1 | 0.3$^{(1)}$ | 34.6 | 15.8 |
| 0.1 | 0.3$^{(2)}$ | 24.7 | 19.2 |
| 0.1 | 0.3$^{(3)}$ | 57.8 | 7.7 |

It is clearly seen that, with the mercapto ester, one can obtain results superior to those obtained with a fourfold increase in metal content, it is also seen that the other mercaptans, although containing the same number of carbon atoms, are significantly less effective.

B. The mercaptans were evaluated in the polymer formulation of part A. The metal-containing stabilizer component was a combination of monobutyltin-(isooctylmercaptoacetate)(sulfide) and butyltin trichlorride, formulated as follows:

| | PBW |
|---|---|
| $C_4H_9$-Sn-(IOMA) (S) | 37 |
| $C_4H_9SnCl_3$ | 3 |
| Antioxidant | 5 |
| Mineral Oil | 37 |
| DOP | 18 |

The polymer formulation was worked up and tested as in part A above. The following results were obtained:

| % Stabilizer Formulation | % Mercapto Compound | W.I. | Y.I. |
|---|---|---|---|
| 0.4 | — | 37.7 | 14.7 |
| 0.2 | 0.2$^{(1)}$ | 20.4 | 21.2 |
| 0.2 | 0.2$^{(2)}$ | 3.4 | 27.9 |
| 0.2 | 0.2$^{(3)}$ | 43.2 | 12.8 |

C. The mercaptans were evaluated in the following formulation:

|  | PBW |
|---|---|
| Vinyl chloride homopolymer | 100.0 |
| TiO$_2$ | 12.0 |
| Acrylate-diene impact modifier | 5.0 |
| Calcium stearate | 2.0 |
| Paraffin Wax and Processing acid | 1.3 |
| Stabilizer | 1.32 |

The metal-containing stabilizer component was a combination of maleate derivatives comprising about ⅔ dibutyltin distearylmaleate and about ⅓ dibutyltin maleate, on a weight basis.

The polymer formulations were worked up and tested in accordance with the procedures described in part A above; the following results were obtained:

| % Stabilizer Formulation | % Mercapto Compound | W.I. | Y.I. |
|---|---|---|---|
| 1.1 | — | 35.2 | 20.1 |
| 0.6 | 0.5$^{(1)}$ | 37.5 | 17.2 |
| 0.6 | 0.5$^{(2)}$ | 49.7 | 13.0 |
| 0.6 | 0.5$^{(3)}$ | 53.7 | 11.7 |

It is again seen that all the mercapto compounds are not equivalent in performance and that by the practice of this invention one can obtain improved results while significantly reducing the amount of metal-containing stabilizer.

EXAMPLE XV

A. This example illustrates the effect of mercaptoethyl oleate in conjunction with the stabilizer composition of Example XIV, Part B.

The formulation of Example XIV, Part A was prepared and tested using various levels of the tin-containing stabilizer composition and mercapto ester.

The results are as follows:

| % Stabilizer Composition | % Mercapto Ester | W.I. |
|---|---|---|
| 0.40 | — | 41.0 |
| 0.35 | 0.05 | 41.9 |
| 0.30 | 0.10 | 41.0 |
| 0.25 | 0.15 | 46.8 |
| 0.20 | 0.20 | 44.8 |
| 0.15 | 0.25 | 42.6 |
| 0.10 | 0.30 | 35.6 |

B. This part illustrates the effects obtained by a combination of mercaptoethyl oleate with various tin-containing stabilizers. Testing was conducted on the same formulation as Part A above, using the same tin content. In addition to Whiteness Index, the systems were evaluated with respect to viscosity with a torque theometer; the results are reported in minutes:

| Tin Compound | % Tin Cpd. | % Ester | Color W.I. | Viscosity: Time (min.) |
|---|---|---|---|---|
| A. | 0.075 | — | 29.1 | 4.4 |
|  | 0.075 | 0.10 | 39.2 | 4.6 |
|  | 0.075 | 0.20 | 43.2 | 4.6 |
| B. | 0.075 | — | 26.5 | 4.4 |
|  | 0.075 | 0.20 | 35.2 | 4.4 |
|  | 0.075 | 0.20 | 39.9 | 4.9 |
| C. | 0.112 | — | 35.3 | 4.2 |
|  | 0.112 | 0.10 | 44.5 | 4.3 |
|  | 0.112 | 0.20 | 48.4 | 4.7 |
| D. | 0.095 | — | 28.6 | 4.5 |
|  | 0.095 | 0.10 | 44.1 | 4.5 |
|  | 0.095 | 0.20 | 41.2 | 4.6 |

A=monobutyltin(dodecylmercaptide)(sulfide)
B=poly[monobutyltin isooctymercaptoacetate sulfide]
C=(monobutyltin mercaptoethyl oleate)(sulfide)

(III)

EXAMPLE XVI

This example presents the results obtained when the mercaptoethyl esters of tall oil fatty acids were screened in conjunction with various tin compounds.

The following stabilizer composition was prepared:

|  | Wt. % |
|---|---|
| Mercaptoethyl tallate | 34 |
| Tin stabilizer | X |
| Mineral Oil | 66-X |

The amount of tin stabilizer was adjusted so that all stabilizer compositions contained 6.5% tin.

The stabilizer composition was evaluated in the vinyl halide formulation of Example XV; it was added at a level of 0.4 parts per 100 parts resin and the effect on color and viscosity control were measured, with and without the mercaptoester. Where the components were not compatible, they were added to the vinyl halide formulation separately.

| Tin Compound | % Mercaptoethyl tallate | W. I. | Stability in min. |
|---|---|---|---|
| E | — | 27.2 | 5.1 |
| E | 34 | 29.8 | 5.2 |
| F | — | 42.9 | 5.0 |
| F | 34 | 42.8 | 5.2 |
| G | — | 3.2 | 4.7 |
| G | 34 | 21.2 | 5.1 |
| H | — | 20.4 | 5.1 |
| H | 34 | 46.2 | 5.6 |
| I | — | 12.7 | 5.0 |
| I | 34 | 51.1 | 5.4 |

E = monobutyltin tri(mercaptoethyloleate)

-continued

| Tin Compound | % Mercaptoethyl tallate | W. I. | Stability in min. |
|---|---|---|---|

F = Bu—Sn(MEO)(MEO)—S—Sn(MEO)(MEO)—Bu where Bu = butyl
MEO = mercaptoethyl oleate
G = BuSn(SCH$_2$CH$_2$OH)$_3$
H = [BuSn(S)SCH$_2$CH$_2$OH]

I = Bu—Sn(SCH$_2$CH$_2$OH)(SCH$_2$CH$_2$OH)—S—Sn(S—CH$_2$CH$_2$OH)(S—CH$_2$CH$_2$OH)—Bu

What is claimed is:

1. A method of stabilizing a vinyl halide resin comprising the steps of:
   adding to the vinyl halide resin
   (a) a metal containing stabilizer corresponding to formula I $$RSn(S)(SR'') \quad (I)$$

in which,
   R represents an alkyl group, and
   SR'' represents a mercaptide ligand; and
   (b) a mercapto alkanol ester of a carboxylic acid which is added to said resin in an amount from about 2 to 25 times the amount of the Sn in said metal containing stabilizer,
   wherein said mercapto alkanol ester of a carboxylic acid has the formula:

$$R^aCOOR^bSH$$

where $R^a$ is a linear or branched alkyl or alkenyl, aryl or aralkyl; and
   $R^b$ represents a $C_2$ to $C_{18}$ alkylene, and replaces from about 20% to about 90% by weight of the metal containing stabilizer and wherein said composition has a heat or light stability at least comparable to a composition where said mercapto alkanol ester does not replace about 20% to about 90% by weight of the metal containing stabilizer.

2. The method of claim 1, wherein said mercaptide ligand is a derivative of a carboxylic acid, a polycarboxylic acid, a mercaptan, a mercaptoacid, a mercaptoalcohol, a mercaptoacid ester, or a mercaptoalcohol ester.

3. The method of claim 1, wherein said mercaptide ligand is an ester of mercaptocarboxylic acid, a 2-mercaptoalkanol ester of a carboxylic acid, a 2-mercaptoalkanol, or an alkyl thiol.

4. The method of claim 1, where the carboxylic acid is at least one chosen from caprylic, pelargonic, capric, undecanoic, lauric, myristic, palmitic, stearic, isostearic, 2-ethylhexanoic, neodecanoic, oleic, or linoleic.

5. The method of claim 1, wherein the mercapto alkanol ester of a carboxylic acid is at least one chosen from mercapto ethyl stearate, 3-thio-glyceryl myristate, mercapto ethyl palmitate, mercaptoethyl oleate, or mercapto ethyl myristate.

6. The method of claim 1, wherein the mercapto alkanol ester of a carboxylic acid is present in the range of 0.01% wt. to 5.0% wt of the vinyl halide resin.

7. The method of claim 1, wherein the mercapto alkanol ester of a carboxylic acid is present in the range of 0.1% wt. to 1.0% wt. of the vinyl halide resin.

8. The method of claim 1, wherein the vinyl halide resin is polyvinyl chloride.

9. The method of claim 1, where the carboxylic acid comprises at least one natural fatty acid present in peanut oil, tall oil, safflower oil, soybean oil, tallow, lanolin, palm oil, or coconut oil.

10. A method of stabilizing a vinyl halide resin comprising the steps of:
    adding to the vinyl halide resin (a) a metal containing stabilizer of formula II $$R_nSn(SR'')_x \quad (II)$$

in which,
    R represents an alkyl group
    SR'' represents a mercaptide ligand
    n=1 or 2, and
    x=4−n, wherein x is an integer; and
    (b) a mercapto alkanol ester of a carboxylic acid which is added to said resin in an amount from about 2 to 25 times the amount of the Sn in said metal containing stabilizer,
    wherein said mercapto alkanol ester of a carboxylic acid has the formula:

$$R^aCOOR^bSH$$

where $R^a$ is a linear or branched alkyl or alkenyl, aryl or aralkyl; and
    $R^b$ represents a $C_2$ to $C_{18}$ alkylene, and replaces from about 20% to about 90% by weight of the metal containing stabilizer and wherein said composition has a heat or light stability at least comparable to a composition where said mercapto alkanol ester does not replace about 20% to about 90% by weight of the metal containing stabilizer.

11. The method of claim 10, wherein said mercaptide ligand is a derivative of a carboxylic acid, a polycarboxylic acid, a mercaptan, a mercaptoacid, a mercaptoalcohol, a mercaptoacid ester, or a mercaptoalcohol ester.

12. The method of claim 10, wherein said mercaptide ligand is an ester of mercaptocarboxylic acid, a 2-mercaptoalkanol ester of a carboxylic acid, a 2-mercaptoalkanol, or an alkyl thiol.

13. The method of claim 10, where the carboxylic acid is at least one chosen from caprylic, pelargonic, capric, undecanoic, lauric, myristic, palmitic, stearic, isostearic, 2-ethylhexanoic, neodecanoic, oleic, or linoleic.

14. The method of claim 10, wherein the mercapto alkanol ester of a carboxylic acid is at least one chosen from mercapto ethyl stearate, 3-thio-glyceryl myristate, mercapto ethyl palmitate, mercaptoethyl oleate, or mercapto ethyl myristate.

15. The method of claim 10, wherein the mercapto alkanol ester of a carboxylic acid is present in the range of 0.01% wt. to 5% wt. of the vinyl halide resin.

16. The method of claim 10, wherein the mercapto alkanol ester of a carboxylic acid is present in the range of 0.1% wt. to 1.0% wt. of the vinyl halide resin.

17. The method of claim 10, wherein the vinyl halide resin is polyvinyl chloride.

18. The method of claim 10, where the carboxylic acid comprises at least one natural fatty acid present in peanut oil, tall oil, safflower oil, soybean oil, tallow, lanolin, palm oil, or coconut oil.

19. A method of stabilizing a vinyl halide resin comprising:
adding to the vinyl halide resin
(a) at least two metal containing stabilizers chosen from formulas I, II, and III, wherein
formula I is:

$$RSn(S)(SR'') \qquad (I)$$

in which,
R represents an alkyl group, and
SR" represents a mercaptide ligand,
formula II is:

$$R_nSn(SR')_x \qquad (II)$$

in which,
R represents an alkyl group
SR" represents a mercaptide ligand,
n=1 or 2, and
x=4−n, wherein x is an integer, and
formula III is:

in which,
A and $A^1$ represent at least one alkyl of 1 to 12 carbon atoms, where A and $A^1$ can be the same or different;
$A^2$, $A^3$, $A^4$, and $A^5$ represent at least one lower alkylene;
D, $D^1$, $D^2$, and $D^3$ represent at least one of OH; —($C_6$–$C_{18}$ alkyl); or and
(b) a mercapto alkanol ester of a carboxylic acid having the formula:

$$R^aCOOR^bSH$$

where $R^a$ is a linear or branched alkyl or alkenyl, aryl or aralkyl; and
$R^b$ represents a $C_2$ to $C_{18}$ alkylene, and which is present in an amount by weight from about 2 to about 25 times the amount by weight of the Sn in said metal containing stabilizers.

20. The method of claim 19, where the carboxylic acid is at least one chosen from caprylic, pelargonic, capric, undecanoic, lauric, myristic, palmitic, stearic, isostearic, 2-ethylhexanoic, neodecanoic, oleic, or linoleic.

21. The method of claim 19, wherein the mercapto alkanol ester of a carboxylic acid is at least one chosen from mercapto ethyl stearate, 3-thio-glyceryl myristate, mercapto ethyl palmitate, mercaptoethyl oleate, or mercapto ethyl myristate.

22. The method of claim 21, wherein the mercapto alkanol ester of a carboxylic acid is present in the range of 0.01% wt. to 5% wt of the vinyl halide resin.

23. The method of claim 22, wherein the mercapto alkanol ester of a carboxylic acid is present in the range of 0.1% wt. to 1.0% wt. of the vinyl halide resin.

24. The method of claim 23, wherein the vinyl halide resin is polyvinyl chloride.

25. The method of claim 19, where the carboxylic acid comprises at least one natural fatty acid present in peanut oil, tall oil, safflower oil, soybean oil, tallow, lanolin, palm oil, or coconut oil.

26. The method of claim 19, wherein A and $A^1$ comprise at least one of methyl, butyl or octyl.

27. The method of claim 19, wherein at least one of $A^2$, $A^3$, $A^4$, and $A^5$ is ethylene.

28. The method of claim 19, wherein said metal containing stabilizer of formula III is:

where
A and $A^1$ represent methyl, butyl or octyl and can be the same or different, and
ME represents a mercaptoethyl stearate, a mercaptoethyl oleate, or a mercaptoethyl linoleate and can be the same or different.

29. The method of claim 28, wherein A and $A^1$ are both butyl and ME is mercaptoethyl oleate.

30. The method of claim 19, wherein the combination of D and $D^1$ or the combination of $D^2$ and $D^3$ form the group where m is an integer from 0 to 8.

31. The method of claim 19, wherein said mercaptide ligand of formulas I and II is a derivative of carboxylic acid, a polycarboxylic acid, a mercaptan, a mercaptoacid, a mercaptoalcohol, a mercaptoacid ester, or a mercaptoalcohol ester.

32. The method of claim 31, wherein said mercaptide ligand is an ester of mercaptocarboxylic acid, a 2-mercaptoalkanol ester of a carboxylic acid, a 2-mercaptoalkanol, or an alkyl thiol.

33. The method of claim 19, where $R^a$ in formulas I and II contains 6 to 38 carbon atoms.

34. The method of claim 33, where $R^a$ contains 8 to 18 carbon atoms.

* * * * *